(12) United States Patent
Tabet et al.

(10) Patent No.: US 9,794,015 B2
(45) Date of Patent: Oct. 17, 2017

(54) CELL MEASUREMENTS IN UNLICENSED FREQUENCY BANDS

(71) Applicant: Apple Inc., Cupertino, CA (US)

(72) Inventors: Tarik Tabet, Los Gatos, CA (US); Farouk Belghoul, Campbell, CA (US); Dawei Zhang, Saratoga, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 14/667,745

(22) Filed: Mar. 25, 2015

(65) Prior Publication Data

US 2015/0288475 A1   Oct. 8, 2015

Related U.S. Application Data

(60) Provisional application No. 61/975,116, filed on Apr. 4, 2014.

(51) Int. Cl.
*H04W 4/00* (2009.01)
*H04J 11/00* (2006.01)
*H04L 25/02* (2006.01)
*H04W 48/16* (2009.01)

(52) U.S. Cl.
CPC ......... *H04J 11/0079* (2013.01); *H04J 11/005* (2013.01); *H04L 25/0228* (2013.01); *H04L 25/0204* (2013.01); *H04W 48/16* (2013.01)

(58) Field of Classification Search
CPC .............................. H04W 24/08; H04W 48/16
USPC ........................................................ 370/329
See application file for complete search history.

(56) References Cited

U.S. PATENT DOCUMENTS

| 6,680,969 B1* | 1/2004 | Molnar | ................. H04B 1/707 |
| | | | 375/224 |
| 2008/0101507 A1 | 5/2008 | Oketani et al. | |
| 2008/0285433 A1 | 11/2008 | Akita et al. | |
| 2010/0271968 A1 | 10/2010 | Liu et al. | |

(Continued)

FOREIGN PATENT DOCUMENTS

| EP | 1128592 | 8/2001 |
| EP | 1898531 A2 | 12/2008 |

(Continued)

OTHER PUBLICATIONS

Office Action for German Patent Application No. 102015205852.2, Aug. 17, 2016, pp. 1-9.

(Continued)

*Primary Examiner* — Farah Faroul
(74) *Attorney, Agent, or Firm* — Meyertons Hood Kivlin Kowert & Goetzel, P.C.; Jeffrey C. Hood (57) ABSTRACT

This disclosure relates to performing cell measurements in unlicensed frequency bands and/or in channels with interference. According to some embodiments, a wireless user equipment (UE) device may define a reference symbol vector for a cell. Each respective element of the reference symbol vector may correspond to a respective subcarrier of the cell that carries a respective reference symbol. The UE may perform channel estimation at each respective element of the reference symbol vector. The UE may estimate the cell strength of the cell by cross-correlating channel estimates of different elements of the reference symbol vector.

20 Claims, 7 Drawing Sheets

(56) References Cited

U.S. PATENT DOCUMENTS

| | | | |
|---|---|---|---|
| 2011/0045831 A1* | 2/2011 | Chiu | H04W 72/082 455/436 |
| 2012/0039207 A1* | 2/2012 | Eriksson | H04L 1/0015 370/252 |
| 2012/0099632 A1 | 4/2012 | Bury | |
| 2013/0215945 A1* | 8/2013 | Eitel | H04L 25/0238 375/224 |
| 2014/0024388 A1 | 1/2014 | Earnshaw et al. | |
| 2014/0064391 A1* | 3/2014 | Cheng | H04B 7/024 375/267 |
| 2014/0078912 A1 | 3/2014 | Park et al. | |
| 2014/0133607 A1 | 5/2014 | Pu et al. | |
| 2014/0341174 A1 | 11/2014 | Jonsson | |
| 2015/0327162 A1* | 11/2015 | Lee | H04W 24/08 370/252 |
| 2016/0269945 A1* | 9/2016 | Jang | H04W 72/0453 |

FOREIGN PATENT DOCUMENTS

| | | |
|---|---|---|
| JP | 2001268048 A | 9/2001 |
| WO | 2013144715 A1 | 10/2013 |

OTHER PUBLICATIONS

Japanese Office Action, Application No. 2015-077115, mailed Mar. 28, 2016, 6 pages.

\* cited by examiner

CELL MEASUREMENTS IN UNLICENSED FREQUENCY BANDS

PRIORITY CLAIM

The present application claims benefit of priority to U.S. Provisional Application No. 61/975,116 titled "Cell Measurements in Unlicensed Frequency Bands" and filed on Apr. 4, 2014, which is hereby incorporated by reference in its entirety as though fully and completely set forth herein.

FIELD

The present application relates to wireless communication systems, including to an apparatus, system and method for performing cell measurements in channels on which interference may be present.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands which have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of apparatuses, systems, and methods for performing cell measurements in unlicensed frequency bands and/or channels on which substantial interference is possible, and of devices configured to implement the methods.

While cellular network controlled frequency bands (e.g., licensed bands) may be subject to relatively little external interference, unlicensed bands can be subject to interference from other wireless communication technologies, among various possible sources. For example, Bluetooth, Wi-Fi, and/or any of various other wireless communication technologies may be deployed on Industrial, Scientific, Medical (ISM) frequency bands such as those at 2.4 GHz or 5 GHz.

One possible way of measuring cell strength of a cell in a cellular communication network may include autocorrelating reference symbol subcarriers of the cell. However, this technique may overestimate the strength of the cell if interference is present, since it may not differentiate between (at least a portion of) interference power and signal power.

Accordingly, as an alternate technique for measuring cell strength of a cell in a cellular communication network, it may be possible to cross-correlate reference symbol subcarriers of the cell in order to cancel interference terms. For example, a wireless device may construct a vector of reference symbol subcarriers of a cell. The wireless device may perform channel estimation on each element of the vector, and then may cross-correlate those channel estimations with each other to generate a signal strength estimate.

Such a signal strength estimate may be provided back to a serving cell of the wireless device to provide a more accurate estimation of the cell's signal strength, which may in turn improve cell selection and re-selection procedures for the wireless device. A signal strength estimate calculated in this manner may be provided on a standalone basis (e.g., as a replacement for any alternate signal strength measurement technique), in some embodiments. Alternatively, it may be provided in combination with a signal strength estimate generated in another manner, such as by autocorrelating reference symbol subcarriers of the cell. This may be helpful in some instances as a technique for estimating the interference power present in a cell, since the difference between estimates calculated using such techniques may (at least in some instances) be representative of the interference power present in the cell.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
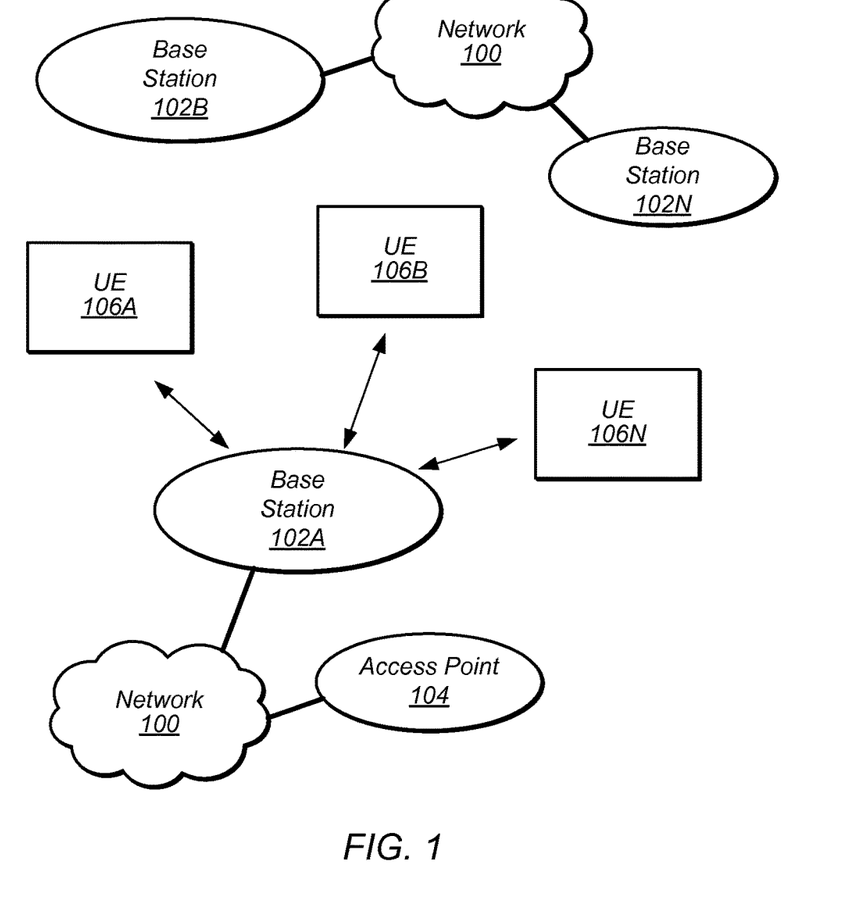
FIG. 1 illustrates an exemplary (and simplified) wireless communication system, according to some embodiments.
Figure 2:
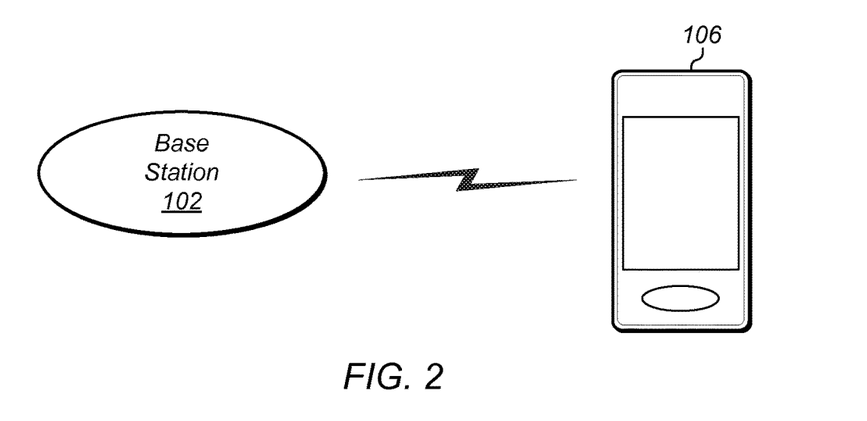
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1xRTT, 1xEV-DO, HRPD, eHRPD), Wi-Fi, WiMAX etc.

Additionally, one or more access points (such as access point 104) may be communicatively coupled to the network 100. These may include Wi-Fi access points configured to support cellular network offloading and/or otherwise provide wireless communication services as part of the wireless communication system illustrated in FIG. 1.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a wide geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells which provide any of various other granularities of service area size. For example, base stations 102A-B illustrated in FIG. 1 might provide macro cells, base station 102N might provide a micro cell, and access point 104 might be a Wi-Fi AP which provides a WLAN. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

Figure 3:
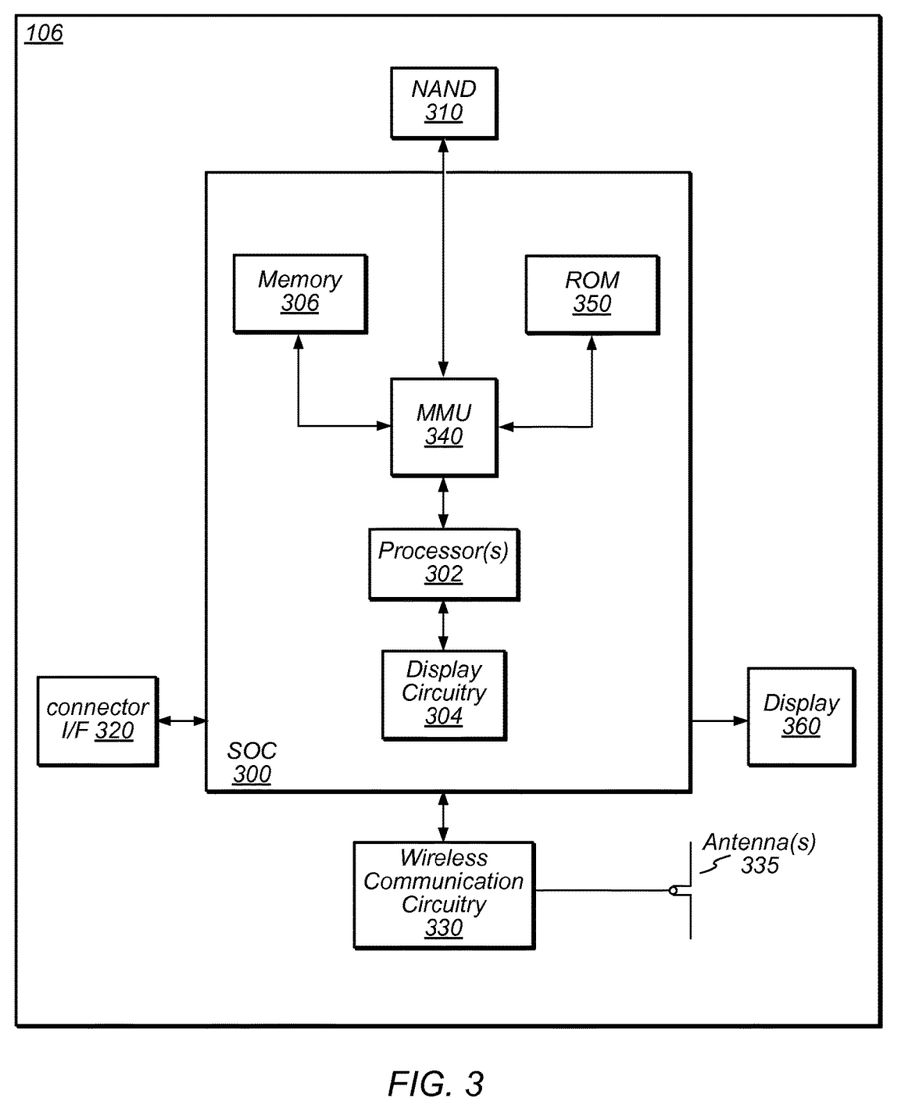
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna, and in some embodiments multiple antennas, for performing wireless communication with base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
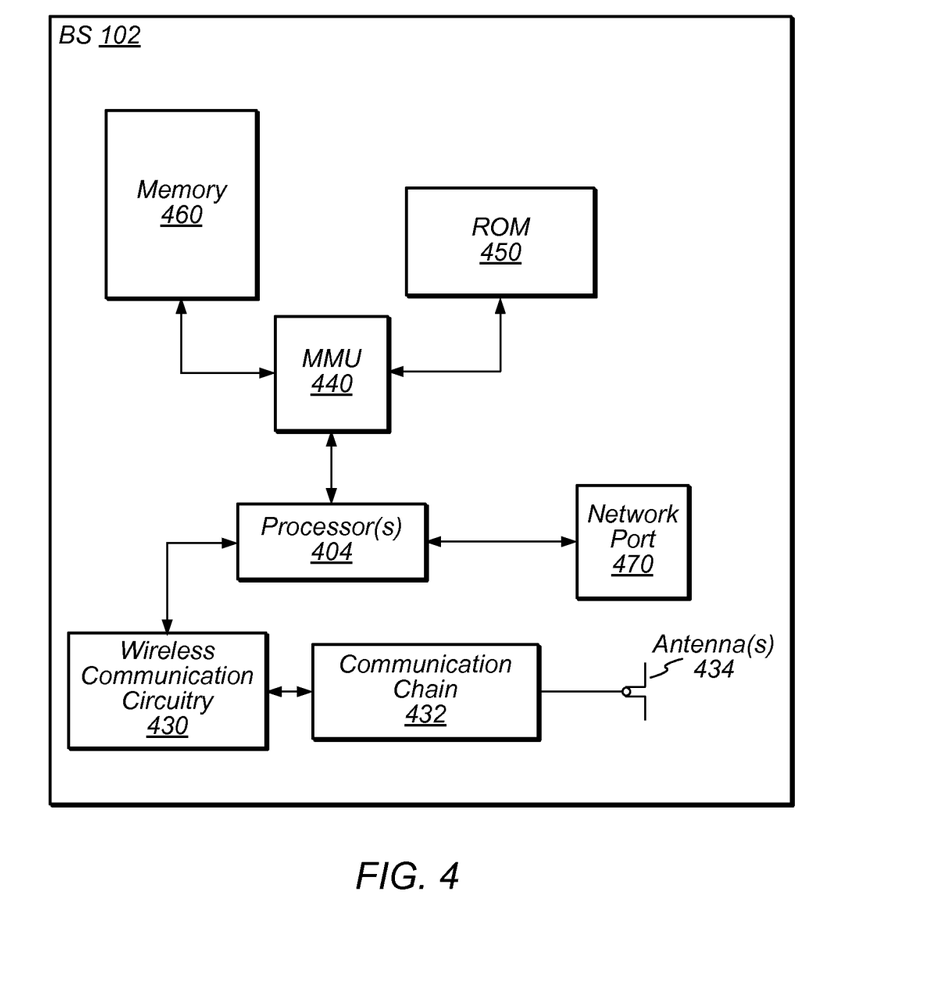
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the wireless communication circuitry 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio which is capable of performing communications according to any of multiple wireless communication technologies (e.g., LTE and Wi-Fi).

The BS 102 may include hardware and software components for implementing part or all of the methods described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

FIG. 5—Flowchart

Figure 5:
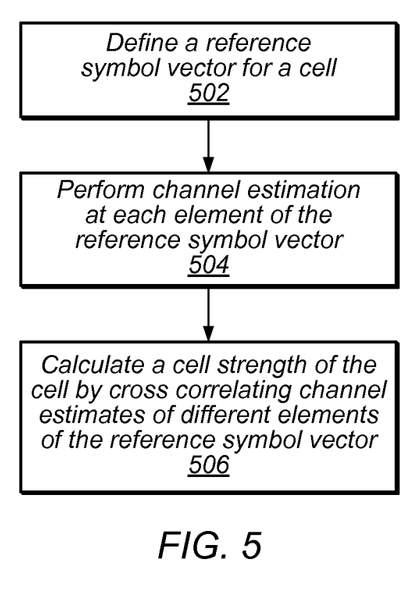
FIG. 5 is a flowchart diagram illustrating an exemplary method for performing cell measurements in unlicensed frequency bands, according to some embodiments.

FIG. 5 is a flowchart diagram illustrating a method for performing cell measurements, according to some embodiments. The method may suppress inaccuracy which might otherwise be introduced by interference, and which might cause cell strength to be overestimated. Accordingly, the method may be particularly suitable for use in channels on which interference may be reasonably expected, such as channels in unlicensed frequency bands, at least in some instances. The method may also be used in other applications (e.g., in licensed frequency bands in which interference may be more tightly controlled and thus limited, at least in some instances), as desired. Aspects of the method of FIG. 5 may be implemented by a wireless user equipment (UE) device, or more generally in conjunction with any of the computer systems or devices shown in the above Figures, among other devices, as desired.

In various embodiments, some of the elements of the method shown may be performed concurrently, in a different order than shown, or may be omitted. Additional elements may also be performed as desired. As shown, the method may operate as follows.

In 502, a reference symbol vector may be defined for a cell. Each respective element of the reference symbol vector may include or represent a respective subcarrier of the cell which carries a respective reference symbol (e.g., a cell-specific reference symbol). The cell may be on a channel in an unlicensed frequency band, in some instances.

If desired, the elements of the reference symbol vector may include subcarriers from multiple different OFDM symbols. For example, in an exemplary LTE system, reference symbols might be found at subcarriers 0 and 6 of the first OFDM symbol (symbol 0) of each slot, and at subcarriers 3 and 9 of the fifth OFDM symbol (symbol 4) of each slot. In this case, by including the reference symbol carrying subcarriers of both OFDM symbols 0 and 4, the potential impact of frequency selectivity may be reduced, for example as compared to a scenario in which only the subcarriers 0 and 6 from OFDM symbol 1 are used in the reference symbol vector.

In 504, channel estimation may be performed at each respective element of the reference symbol vector. This may include, for each respective element, multiplying a signal received at the respective subcarrier of the element by a conjugate of the respective reference symbol carried by the respective subcarrier.

In 506, a cell strength of the cell may be calculated in a first manner. As a particular example, the cell strength calculation may be a reference signal received power (RSRP) calculation in an LTE communication system. Alternate cell strength calculations are also possible.

The first manner of cell strength calculation may include cross-correlating channel estimates of different elements of the reference symbol vector. Such cross-correlation may substantially reduce (cancel) the effect of interference and noise on the cell strength calculation. If applicable and desired, the cell strength sub-calculations may be performed on per-path (e.g., based on the number of transmit and receive antennas) bases and combined (in a weighted or linear manner, as desired) to produce an averaged cell strength estimate. Additionally or alternatively, if desired, long term averaging in the time domain may also be performed. An exponential or linear window may be used in such a case, among various possibilities. At least in some instances, an exponential window may at least partially smooth the potentially bursty nature of Wi-Fi interference, for example.

At least in some instances, the calculated cell strength(s) may be reported (e.g., among various other possible cell measurements) to a base station. For example, a UE may occasionally (e.g., periodically, or upon request) transmit a cell measurement report including cell strength measurements obtained via the method of FIG. 5 to a serving base station of the UE. The cell measurements may be used for any of various purposes, such as link adaptation, cell re-selection, handover, etc.

In some embodiments, the UE may also calculate the cell strength of the cell in a second manner. For example, reference symbol subcarriers of the cell may be autocorrelated according to the second manner of cell strength calculation. In the absence of interference, this may provide a similar result as the first manner of cell strength calculation; in the presence of interference, this may result in a higher estimated cell strength than the first manner of cell strength calculation, where the difference may be representative of the interference present in the cell.

In such embodiments, the UE may also report the cell strength as calculated in the second manner to the base station. The two calculated cell strength values may be provided in any of various manners. For example each calculated cell strength value may be provided as an absolute value (i.e., without reference to the each other), as one possibility, or one calculated cell strength value may be provided and a difference between the calculated cell strength values may be provided as an indication of the other calculated cell strength value, as another possibility.

Note that part or all of the method of FIG. 5 may be repeated as desired. For example, a UE might repeat (or simultaneously perform) the method of FIG. 5 for each of multiple cells in a measurement set on which the UE is tasked with performing cell measurements at a particular time. As another (alternate or additional) possibility, a UE might repeat the method of FIG. 5 on an occasional (e.g., periodic) temporal basis, for example in order to maintain a current or recent cell strength estimate for a particular cell on an ongoing basis. Furthermore, at least in some instances, such previous cell strength estimates for a cell may be used as part of a time-domain averaging technique, such as previously described herein.

Figure 6:
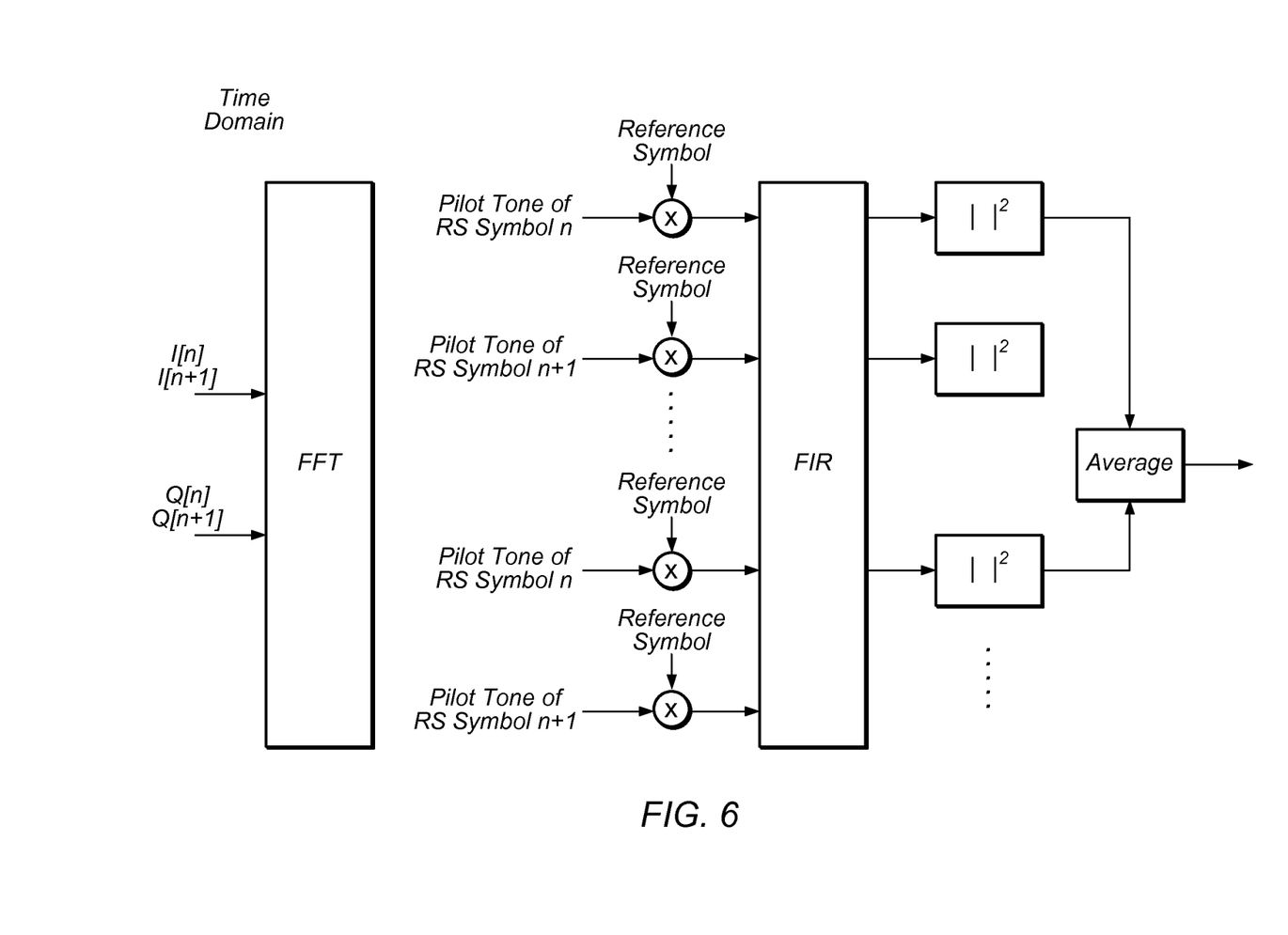
FIG. 6 is a block diagram illustrating exemplary RSRP measurement components according to one RSRP measurement technique, according to some embodiments.
Figure 7:
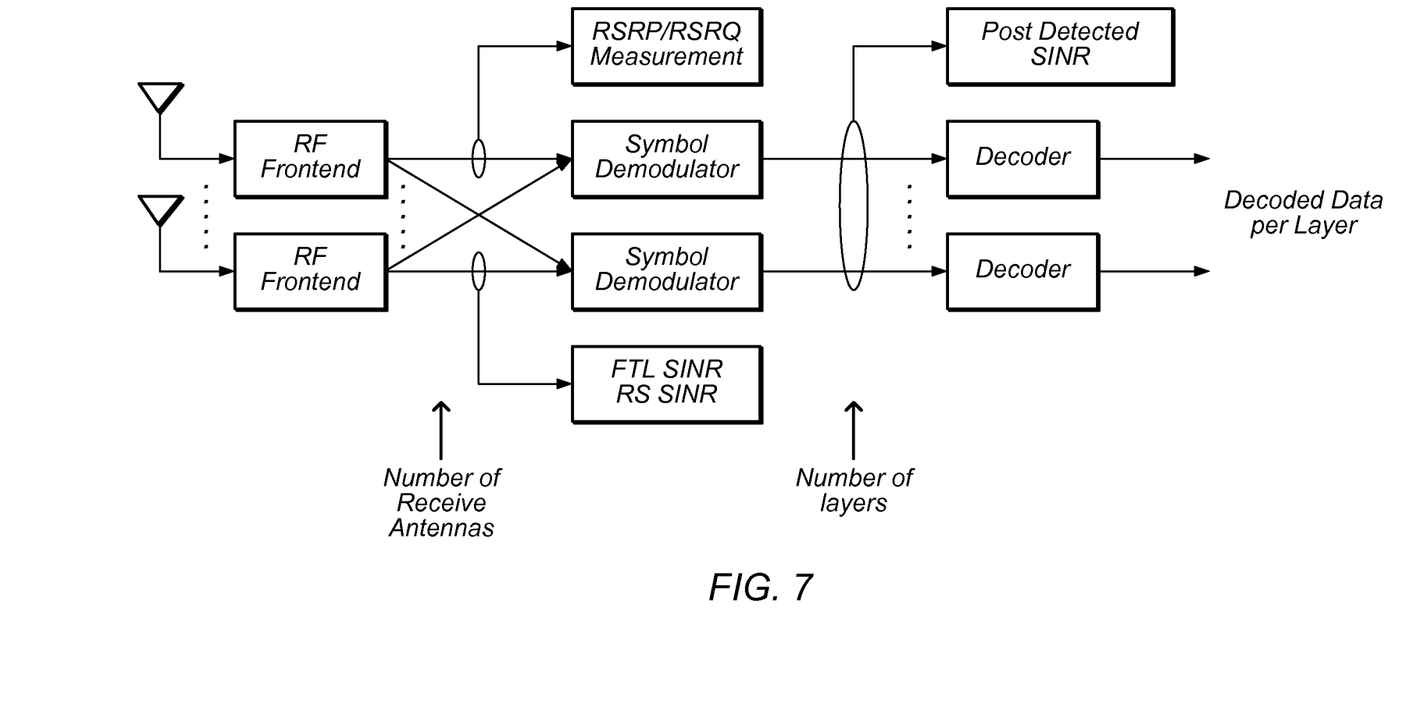
FIG. 7 is a block diagram illustrating exemplary possible RF measurement blocks in a wireless device front-end, according to some embodiments.
Figure 8:
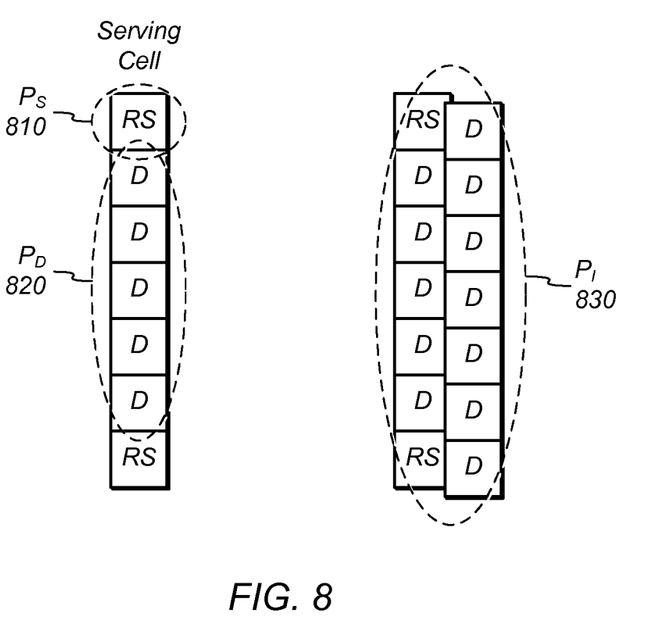
FIG. 8 illustrates conceptual components of various physical layer cell measurements, according to some embodiments.

FIGS. 6-8—Additional Information

FIGS. 6-8 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

In 3GPP cellular networks, the traffic growth can be difficult to address with the licensed spectrum currently available for LTE systems in many urban markets. 5 GHz and other license-free bands represent possible additional spectrum to augment their service offerings. At least in some instances, unlicensed spectrum may not match the qualities of licensed spectrum. Solutions that allow an efficient use of unlicensed spectrum, for example as a complement to licensed deployments, may be of value. As one possibility, the LTE RAT may be deployed into unlicensed deployments: 5 GHz and other license-free bands may be used to deploy LTE as carrier aggregation complements to licensed band communication, or as stand alone LTE deployments.

One aspect of LTE communication is the use of LTE measurements. LTE measurements may provide cell specific signal strength metrics. According to some embodiments, these measurements may be used to rank different LTE candidate cells according to their signal strength, for example for handover and cell re-selection decisions. As one example, RSRP may be used to measure the average received power over the resource elements that carry cell-specific reference signals within a certain frequency bandwidth. As another example, reference signal received quality (RSRQ) may be a carrier-to-interference (C/I) type of measurement which indicates the quality of the received reference signal. The RSRQ measurement may be used, at least in some embodiments, to provide additional information when RSRP is not sufficient to make a reliable handover or cell re-selection decision. RSRQ may be defined by (at least some versions of) the 3GPP specification as:

$$RSRQ = N \frac{RSRP}{RSSI} [dB]$$

where RSSI is received signal strength indicator and N is the number of resource blocks over which the measurement is performed.

FIG. 6 is a block diagram illustrating exemplary RSRP measurement components according to one possible RSRP measurement technique. As shown, in phase (I) and quadrature (Q) signals received in the time domain may be provided to a Fast Fourier Transform (FFT) block. The pilot tones (reference symbol carrying subcarriers) for each reference symbol may be used, in conjunction with the appropriate reference symbol for each pilot tone, to perform least squares (LS) channel estimation in the frequency domain. A finite impulse response (FIR) filter may then be applied and the results averaged to produce an RSRP measurement.

FIG. 7 is a block diagram illustrating exemplary possible RF measurement blocks in a wireless device front-end, according to some embodiments. As shown, signals may be received on each antenna of the wireless device and provided to a respective RF front-end block. Signals may be provided from there to symbol demodulators, with take-offs for RSRP/RSRQ measurements and frequency tracking loop (FTL) and reference symbol (RS) signal to interference plus noise ratio (SINR) estimation. From the symbol demodulators, signals may be provided to decoders, with a take-off for post detected SINR estimation. Decoded data may then be provided to higher layers for further processing.

As previously noted, LTE deployments in unlicensed frequency bands ("LTE-U") may be a useful option for carriers to improve their service offerings. As one possible implementation of such a system, a network may configure a primary carrier (PCell) in a licensed band and a secondary carrier (SCell) in an unlicensed band. The primary carrier may be used to schedule communications and communicate data, while the secondary carrier may be used to communicate data (e.g., according to scheduling communicated by way of the primary carrier). In such a case, the secondary carrier may coexist with WLAN and/or other communications over which the network may not have control.

When LTE-U and Wi-Fi are operating in the same frequency range, various techniques may be possible to enable effective coexistence between the technologies. However, when an LTE-U device performs inter-frequency measurements in other (neighboring) frequencies, the device may not be able to determine whether or not these frequencies are interference-free. In such conditions, measurements which do not account for the possibility of significant interference may lead to non-predictive mobility behavior in the LTE-U space.

Accordingly, an improved RSRP measurement algorithm may be provided for scenarios in which interference may be present, such as in unlicensed deployments. The method may not use channel estimation in the same manner as alternate RSRP measurement techniques (e.g., the FIR filter illustrated in FIG. 6 may be bypassed). This may improve the accuracy in case of interference.

Additionally, in order to overcome any degradation from frequency selectivity of fading channels, the received reference symbols (RSs) from symbols 0 and symbols 4 may be combined in one vector. In such a case the calculation may include a RS from every 3 subcarriers (e.g., rather than every 6 subcarriers), which may reduce the impact of frequency selectivity.

In the case of interference and high noise (e.g., such as in a channel of an unlicensed band in which Wi-Fi may be present), this method may improve rejection of noise+interference by 6 dB or more, e.g., with respect to at least some previously used RSRP measurement techniques.

Additionally, long term averaging in time domain (e.g., 100-200 ms or any other length of time) may be used, for example to reduce the time domain variations. Furthermore, an exponential time window may be used, e.g., to smooth out the potentially bursty nature of WiFi interference.

The following is provided as a more detailed example of a possible improved RSRP measurement technique. Note that variations and alternatives to the below-provided example are also possible.

As a first step, the channel at subcarrier k and from transmit antenna m and receive antenna l, where Y is the received signal and R is the reference symbol at subcarrier k, may be estimated as:

$$H_{LS}^{l,m}(k) = Y_{l,m}(k) R_i^l(k)^*$$

The RSRP may then be computed as (where n is the OFDM symbol index and i is the cell ID):

$$P_{l,m}(i) = \frac{1}{K-1} \frac{1}{N} \sum_{n=0}^{N} \sum_{k=0}^{K-2} H_{LS}^{L,m}(k+1, n)^* \times H_{LS}^{L,m}(k, n), i = 1, 2 \ldots, M_c$$

$$P_l(i) = P_{l0}(i) + P_{l1}(i)$$

$$RSRP(i) = Abs\{combiner(P_0(i) + P_1(i))\}$$

Thus, the channel estimates at the pilot tones forming the reference symbol vector may be crossed with each other, which may serve to cancel Wi-Fi (or other) interference at each reference symbol which may not be cancelled if autocorrelation of each reference symbol is performed instead (e.g., as may be performed in some RSRP calculations). Note that the combiner function may be either a weighted average (e.g., based on the signal strength per path/antenna) or a simple linear average.

In some instances, it may further be desirable to calculate RSRP in multiple ways and report the difference between the results to the network. For example, the difference between RSRP as calculated in the above example and RSRP as calculated by correlating each reference symbol with itself may be reported as a bias in a measurement report. Since the difference between the RSRP as computed according to the different algorithms may be substantially representative of the amount of interference present in the cell, this may be a useful metric to networks to improve LTE-U deployments. Alternatively, RSRP may simply be calculated in the above-described manner and reported to the network without reference to alternate methods of calculating RSRP.

FIG. 8 illustrates conceptual components of various physical layer cell measurements such as RSRP and RSRQ when performed in an unlicensed frequency band, according to some embodiments. As shown, $P_S$ 810 may represent the power of the reference symbol provided by the serving cell (or more generally, the cell being measured). $P_D$ 820 may represent the power of the data symbols provided by the serving cell (or more generally, the cell being measured). $P_I$ 830 may represent interference from adjacent cells (e.g., other LTE-U cells and/or Wi-Fi networks).

While correlating a reference symbol with itself may cancel interference caused by orthogonal transmissions such as may be performed by other LTE cells, Wi-Fi signals may not be suppressed by such calculations. Thus, calculating RSRP in such a manner may result in a inaccurately high RSRP value (and RSRQ value), since the unsuppressed interference may be measured as part of $P_S$ 810. This may also be expressed as follows, where alpha represents the proportion of interference that is not suppressed in RSRP measurements when self-correlation rather than cross-correlation is used to calculate RSRP:

$$\frac{1}{RSRQ} = \frac{RSSI}{N \cdot RSRP} = 2\frac{P_S + P_D + P_I}{P_S} > 2\frac{P_S + P_D + P_I}{P_S + \alpha P_I} = \frac{1}{RSRQ_{inaccurate}}$$

In the following further exemplary embodiments are provided.

One set of embodiments may include a method for performing cell measurements, comprising: defining a reference symbol vector for a cell, wherein each respective element of the reference symbol vector comprises a respective subcarrier of the cell which carries a respective reference symbol; estimating the channel at each respective element of the reference symbol vector; and calculating a cell strength of the cell by cross-correlating channel estimates of different elements of the reference symbol vector.

According to some embodiments, estimating the channel at a respective element of the reference symbol vector comprises multiplying a signal received at the respective subcarrier of the element by a conjugate of the respective reference symbol carried by the respective subcarrier.

In some embodiments, the reference symbol vector comprises elements corresponding to subcarriers comprised in a plurality of OFDM symbols of a subframe of the cell.

According to some embodiments, the cell is on a channel in an unlicensed frequency band.

An additional exemplary embodiment may include a wireless user equipment (UE) device, comprising: a radio; and an processing element operably coupled to the radio; wherein the UE is configured to implement any or all parts of any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user equipment (UE) device to perform cell measurements, comprising:
   by the UE device:
      defining a reference symbol vector for a cell, wherein each respective element of the reference symbol vector comprises a respective subcarrier of the cell that carries a respective reference symbol;
      performing channel estimation at each respective element of the reference symbol vector;
      estimating a cell strength of the cell in a first manner by cross-correlating channel estimates of different elements of the reference symbol vector.

2. The method of claim 1,
   wherein performing channel estimation at a respective element of the reference symbol vector comprises multiplying a signal received at the respective subcarrier of the element by a conjugate of the respective reference symbol carried by the respective subcarrier.

3. The method of claim 1,
   wherein the reference symbol vector comprises elements corresponding to subcarriers comprised in a plurality of orthorgonal frequency-division multiplexing (OFDM) symbols of a subframe of the cell.

4. The method of claim 1,
   wherein the cell is on a channel in an unlicensed frequency band.

5. The method of claim 1, further comprising:
   estimating cell strength of each of a plurality of cells in the first manner by cross-correlating channel estimates of different elements of respective reference symbol vectors for each of the plurality of cells.

6. The method of claim 1, further comprising:
   estimating the cell strength of the cell in a second manner by autocorrelating channel estimates of subcarriers of the cell which carry reference symbols.

7. The method of claim 6, further comprising:
   reporting a difference between the cell strength of the cell estimated in the first manner and the cell strength of the cell estimated in the second manner to a serving cell of the UE device.

8. The method of claim 1,
   wherein the cell operates according to Long-Term Evolution (LTE), wherein the cell strength estimation is an estimation of reference signal received power (RSRP) of the cell.

9. The method of claim 1,
   wherein cross-correlating channel estimates of different elements of the reference symbol vector is configured to reduce at least one of interference and noise effects from the cell strength estimated in the first manner.

10. A wireless user equipment (UE) device, comprising:
a radio; and
a processing element operably coupled to the radio;
wherein the radio and the processing element are configured to:
  calculate cell strength of a first cell, wherein the cell strength of the first cell is calculated at least in part by cross-correlating channel estimates of different reference symbol subcarriers of the first cell; and
  provide an indication of the calculated cell strength of the first cell to a serving cell of the UE device.

11. The UE device of claim 10, wherein the radio and the processing element are further configured to:
define a reference symbol vector for the first cell, wherein each respective element of the reference symbol vector comprises a respective subcarrier of the cell that carries a respective reference symbol,
wherein cross-correlating channel estimates of different reference symbol subcarriers of the first cell comprises cross-correlating channel estimates of elements of the reference symbol vector with each other.

12. The UE device of claim 10, wherein to calculate the cell strength of the first cell, the radio and the processing element are further configured to:
  perform cell strength sub-calculations on a per path basis based on a number of transmit and receive antennas of the first cell and the UE; and
  average the per path cell strength sub-calculations to produce an average cell strength estimate.

13. The UE device of claim 12,
wherein the per path cell strength sub-calculations are averaged in a linear manner.

14. The UE device of claim 12,
wherein the per path cell strength sub-calculations are averaged in a weighted manner.

15. The UE device of claim 10, wherein the radio and the processing element are further configured to:
  perform time-domain averaging of cell strength sub-calculations performed at different times to calculate the cell strength of the first cell.

16. The UE device of claim 15,
wherein the time-domain averaging is performed using an exponential time window.

17. A non-transitory computer accessible memory medium comprising program instructions which, when executed at a device, cause the device to:
  define a reference symbol vector for a cell, wherein each respective element of the reference symbol vector corresponds to a respective subcarrier of the cell that carries a respective reference symbol;
  perform channel estimation at each respective element of the reference symbol vector;
  estimate a cell strength of the cell in a first manner by cross-correlating channel estimates of different elements of the reference symbol vector; and
  provide an indication of the cell strength of the cell as estimated in the first manner to a serving cell of the device.

18. The memory medium of claim 17,
wherein the cell is deployed on a channel in an unlicensed frequency band,
wherein cell strength of the cell is estimated in the first manner based at least in part on the cell being deployed on a channel in an unlicensed frequency band.

19. The memory medium of claim 17, wherein when executed at the device, the program instructions further cause the device to:
  estimate the cell strength of the cell in a second manner by autocorrelating channel estimates of different elements of the reference symbol vector; and
  transmit an indication of the cell strength of the cell as estimated in the second manner to the serving cell of the device.

20. The memory medium of claim 17,
wherein the cell operates according to Long-Term Evolution (LTE),
wherein the reference symbol vector comprises elements corresponding to reference symbol subcarriers comprised at least in orthogonal frequency-division multiplexing (OFDM) symbols 0 and 4 of the cell.

* * * * *